United States Patent
Nagase (10) Patent No.: US 12,555,773 B2
(45) Date of Patent: Feb. 17, 2026

(54) ALL SOLID STATE BATTERY

(71) Applicant: TOYOTA JIDOSHA KABUSHIKI KAISHA, Toyota (JP)

(72) Inventor: Hiroshi Nagase, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1074 days.

(21) Appl. No.: 17/647,778

(22) Filed: Jan. 12, 2022

(65) Prior Publication Data
US 2022/0246912 A1 Aug. 4, 2022

(30) Foreign Application Priority Data
Feb. 4, 2021 (JP) .................................. 2021-016357

(51) Int. Cl.
*H01M 4/13* (2010.01)
*H01M 4/131* (2010.01)
(Continued)

(52) U.S. Cl.
CPC ........... *H01M 4/364* (2013.01); *H01M 4/485* (2013.01); *H01M 10/0585* (2013.01); *H01M 2004/027* (2013.01)

(58) Field of Classification Search
CPC ... H01M 2300/008; H01M 2300/0065; H01M 2300/0068; H01M 2300/0071;
(Continued)

(56) References Cited

U.S. PATENT DOCUMENTS

2014/0295276 A1* 10/2014 Takami ............. H01M 10/0525
252/182.1
2019/0088926 A1 3/2019 Takami et al.
(Continued)

FOREIGN PATENT DOCUMENTS

| JP | 2015185337 A | 10/2015 |
|---|---|---|
| JP | 201953946 A | 4/2019 |
| JP | 2020174004 A | 10/2020 |

*Primary Examiner* — Allison Bourke
*Assistant Examiner* — Charlene Bermudez
(74) *Attorney, Agent, or Firm* — Dickinson Wright, PLLC (57) ABSTRACT

A main object of the present disclosure is to provide an all solid state battery with low resistance. The present disclosure achieves the object by providing an all solid state battery comprising a cathode active material layer, an anode active material layer, and a solid electrolyte layer arranged between the cathode active material layer and the anode active material layer; wherein the anode active material layer includes: a first anode active material and a second anode active material; the first anode active material is a lithium titanate; in the second anode active material, when a discharge capacity at a potential of 1.0 V vs $Li^+/Li$ or more and 2.0 V vs $Li^+/Li$ or less signifies 100% discharge capacity, and when $P_1$ designates an average potential in a capacity of 0% or more and 50% or less of the 100% discharge capacity, and $P_2$ designates an average potential in a capacity of 50% or more and 100% or less of the 100% discharge capacity, a difference between the $P_2$ and the $P_1$ is 0.1 V or more; and when T designates a thickness of the anode active material layer, X designates a region of the anode active material layer that is from an edge of the solid electrolyte layer side to T/2 in a thickness direction, Y designates a region of the anode active material layer that is from the T/2 to an opposite edge from the solid electrolyte layer side in the thickness direction, $X_1$ designates a volume ratio of the first anode active material with respect to a total of the first anode active material and the second anode active material in the X, and $Y_1$ designates a volume ratio of the first anode active material with respect to a total of the first anode active material and the second anode active material in the Y, the $X_1$ is smaller than the $Y_1$.

3 Claims, 3 Drawing Sheets

(51) Int. Cl.
*H01M 4/36* (2006.01)
*H01M 4/485* (2010.01)
*H01M 10/0585* (2010.01)
*H01M 4/02* (2006.01)

(58) Field of Classification Search
CPC . H01M 2300/0074; H01M 2300/0077; H01M 2300/0082
See application file for complete search history.

(56) References Cited

U.S. PATENT DOCUMENTS

2021/0083298 A1\* 3/2021 Sugizaki ............... H01M 4/525
2022/0069347 A1\* 3/2022 Funada ................. H01M 4/131

\* cited by examiner

ALL SOLID STATE BATTERY

TECHNICAL FIELD

The present disclosure relates to an all solid state battery.

BACKGROUND ART

An all solid state battery is a battery including a solid electrolyte layer between a cathode active material layer and an anode active material layer, and one of the advantages thereof is that the simplification of a safety device may be more easily achieved compared to a liquid-based battery including a liquid electrolyte containing a flammable organic solvent.

As an anode active material, lithium titanate has been known. For example, Patent Literature 1 discloses an all solid state battery using a lithium titanate sintered body as a cathode or an anode. Also, Patent Literature 2 discloses an all solid state battery comprising an anode active material layer including a first layer and a second layer, wherein the second layer contains a lithium titanate. Also, although it is not a technology relating to an all solid state batter, Patent Literature 3 discloses an electrode group wherein an anode active material layer contains a titanium-containing oxide.

CITATION LIST

Patent Literatures

Patent Literature 1: Japanese Patent Application Laid-Open (JP-A) No. 2015-185337
Patent Literature 2: JP-A No. 2020-174004
Patent Literature 3: JP-A No. 2019-053946

SUMMARY OF DISCLOSURE

Technical Problem

In a lithium titanate, as described later, the ratio occupied with a plateau region is large in charge and discharge curves. Therefore, when the lithium titanate is used as an anode active material, electrode reactions tend to deviate in the thickness direction of the anode active material layer, and as a result, the resistance tends to increase.

The present disclosure has been made in view of the above circumstances and a main object thereof is to provide an all solid state battery with low resistance.

Solution to Problem

In order to achieve the object, the present disclosure provides an all solid state battery comprising a cathode active material layer, an anode active material layer, and a solid electrolyte layer arranged between the cathode active material layer and the anode active material layer; wherein the anode active material layer includes: a first anode active material and a second anode active material; the first anode active material is a lithium titanate; in the second anode active material, when a discharge capacity at a potential of 1.0 V vs $Li^+/Li$ or more and 2.0 V vs $Li^+/Li$ or less signifies 100% discharge capacity, and when $P_1$ designates an average potential in a capacity of 0% or more and 50% or less of the 100% discharge capacity, and $P_2$ designates an average potential in a capacity of 50% or more and 100% or less of the 100% discharge capacity, a difference between the $P_2$ and the $P_1$ is 0.1 V or more; and when T designates a thickness of the anode active material layer, X designates a region of the anode active material layer that is from an edge of the solid electrolyte layer side to T/2 in a thickness direction, Y designates a region of the anode active material layer that is from the T/2 to an opposite edge from the solid electrolyte layer side in the thickness direction, $X_1$ designates a volume ratio of the first anode active material with respect to a total of the first anode active material and the second anode active material in the X, and $Y_1$ designates a volume ratio of the first anode active material with respect to a total of the first anode active material and the second anode active material in the Y, the $X_1$ is smaller than the $Y_1$.

According to the present disclosure, the first anode active material that is the lithium titanate is used together with the specified second anode active material, and the proportion of the first anode active material in the solid electrolyte layer side is relatively less and the proportion of the first anode active material in the opposite side of the solid electrolyte layer is relatively more, and thus the all solid state battery with low resistance may be obtained.

In the disclosure, the $X_1$ may be 0 volume % or more and 30 volume % or less.

In the disclosure, the $Y_1$ may be 70 volume % or more and 100 volume % or less.

The present disclosure also provides an all solid state battery comprising a cathode active material layer, an anode active material layer, and a solid electrolyte layer arranged between the cathode active material layer and the anode active material layer; wherein the anode active material layer includes: a first anode active material and a second anode active material; the first anode active material is a lithium titanate; in the second anode active material, when a discharge capacity at a potential of 1.0 V vs $Li^+/Li$ or more and 2.0 V vs $Li^+/Li$ or less signifies 100% discharge capacity, and when $P_1$ designates an average potential in a capacity of 0% or more and 50% or less of the 100% discharge capacity, and $P_2$ designates an average potential in a capacity of 50% or more and 100% or less of the 100% discharge capacity, a difference between the $P_2$ and the $P_1$ is 0.1 V or more; and the anode active material layer includes a plurality of structure layer, and in the plurality of structure layer, when a structure layer A designates a layer closest to the solid electrolyte layer, a structure layer B designates a layer farthest from the solid electrolyte layer, $A_1$ designates a volume ratio of the first anode active material with respect to a total of the first anode active material and the second anode active material in the structure layer A, and $B_1$ designates a volume ratio of the first anode active material with respect to a total of the first anode active material and the second anode active material in the structure layer B, the $A_1$ is smaller than the $B_1$.

According to the present disclosure, the first anode active material that is the lithium titanate is used together with the specified second anode active material, and the proportion of the first anode active material in the solid electrolyte layer side is relatively less and the proportion of the first anode active material in the opposite side of the solid electrolyte layer is relatively more, and thus the all solid state battery with low resistance may be obtained.

In the disclosure, the $A_1$ may be 0 volume % or more and 30 volume % or less.

In the disclosure, the $B_1$ may be 70 volume % or more and 100 volume % or less.

In the disclosure, a discharge capacity of the second anode active material at a potential of 1.4 V vs $Li^+/Li$ or more and 2.0 V vs $Li^+/Li$ or less may be 100 mAh/g or more.

In the disclosure, the second anode active material may be at least one of a niobium-titanium oxide and a niobium-tungsten oxide.

Advantageous Effects of Disclosure

The present disclosure exhibits an effect of providing an all solid state battery with low resistance.

DESCRIPTION OF EMBODIMENTS

The all solid state battery in the present disclosure is hereinafter explained in details.

Figure 1:
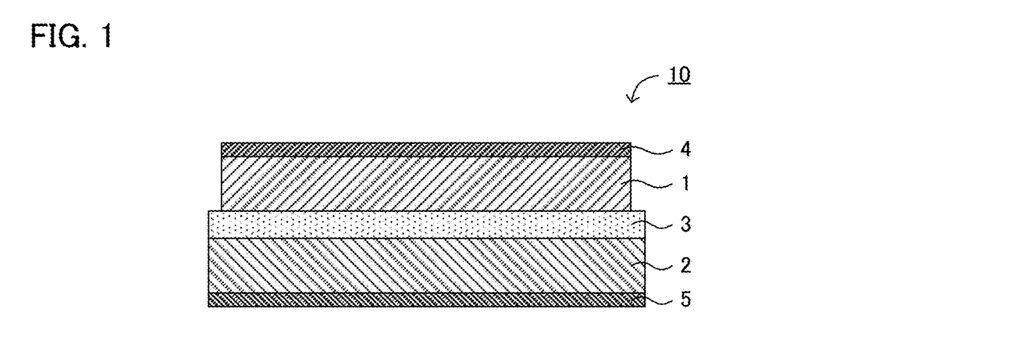
FIG. 1 is a schematic cross-sectional view exemplifying the all solid state battery in the present disclosure.

FIG. 1 is a schematic cross-sectional view exemplifying the all solid state battery in the present disclosure. All solid state battery 10 illustrated in FIG. 1 includes cathode active material layer 1, anode active material layer 2, solid electrolyte layer 3 arranged between cathode active material layer 1 and anode active material layer 2, cathode current collector 4 for collecting currents of cathode active material layer 1, and anode current collector 5 for collecting currents of anode active material layer 2. The anode active material layer 2 contains a lithium titanate as a first anode active material, and a specified active material as a second anode active material.

Figure 2:
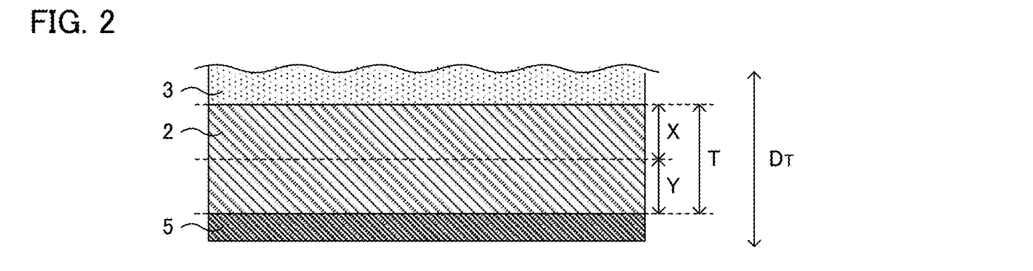
FIG. 2 is a schematic cross-sectional view exemplifying the anode active material layer in the present disclosure.

FIG. 2 is a schematic cross-sectional view exemplifying the anode active material layer in the present disclosure. As shown in FIG. 2, T designates a thickness of the anode active material layer 2, X designates a region of the anode active material layer 2 that is from an edge of the solid electrolyte layer 3 side to T/2 in a thickness direction $D_T$, Y designates a region of the anode active material layer 2 that is from the T/2 to an opposite edge from the solid electrolyte layer 3 side (edge that is the anode current collector 5 side) in the thickness direction $D_T$. In other words, when the anode active material layer 2 is divided into half in the thickness direction $D_T$, the region in the solid electrolyte layer 3 side is X and the region in the anode current collector 5 side is Y. $X_1$ designates a volume ratio of the first anode active material with respect to a total of the first anode active material and the second anode active material in the X region, and $Y_1$ designates a volume ratio of the first anode active material with respect to a total of the first anode active material and the second anode active material in the Y region. In the present disclosure, usually, $X_1$ is smaller than $Y_1$. That is, the volume ratio of the first anode active material (lithium titanate) is relatively less in the X region, and the volume ratio of the first anode active material (lithium titanate) in the Y region is relatively more.

Figure 3:
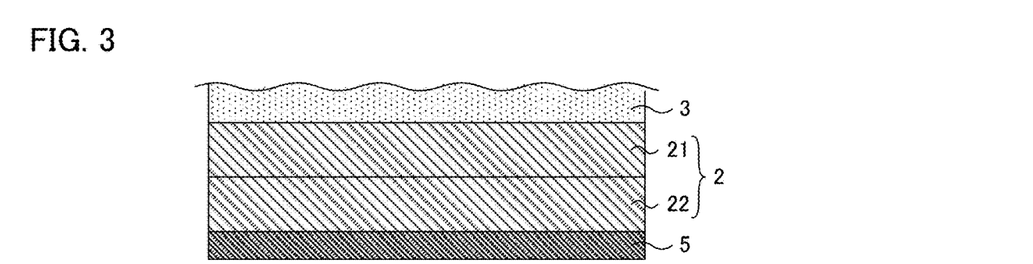
FIG. 3 is a schematic cross-sectional view exemplifying the anode active material layer in the present disclosure.

FIG. 3 is a schematic cross-sectional view exemplifying the anode active material layer in the present disclosure. Anode active material layer 2 shown in FIG. 3 includes a plurality of structure layer (structure layer 21 and structure layer 22). In the plurality of structure layer, a structure layer A designates a layer closest (structure layer 21) to the solid electrolyte layer 3, and a structure layer B designates a layer farthest (structure layer 22) from the solid electrolyte layer 3. Further, $A_1$ designates a volume ratio of the first anode active material with respect to a total of the first anode active material and the second anode active material in the structure layer A, and $B_1$ designates a volume ratio of the first anode active material with respect to a total of the first anode active material and the second anode active material in the structure layer B. In the present disclosure, usually, $A_1$ is smaller than $B_1$. That is, the volume ratio of the first anode active material (lithium titanate) is relatively less in the structure layer A, and the volume ratio of the first anode active material (lithium titanate) in the structure layer B is relatively more.

According to the present disclosure, the first anode active material that is the lithium titanate is used together with the specified second anode active material, and the proportion of the first anode active material in the solid electrolyte layer side is relatively less and the proportion of the first anode active material in the opposite side of the solid electrolyte layer is relatively more, and thus the all solid state battery with low resistance may be obtained.

Figure 4:
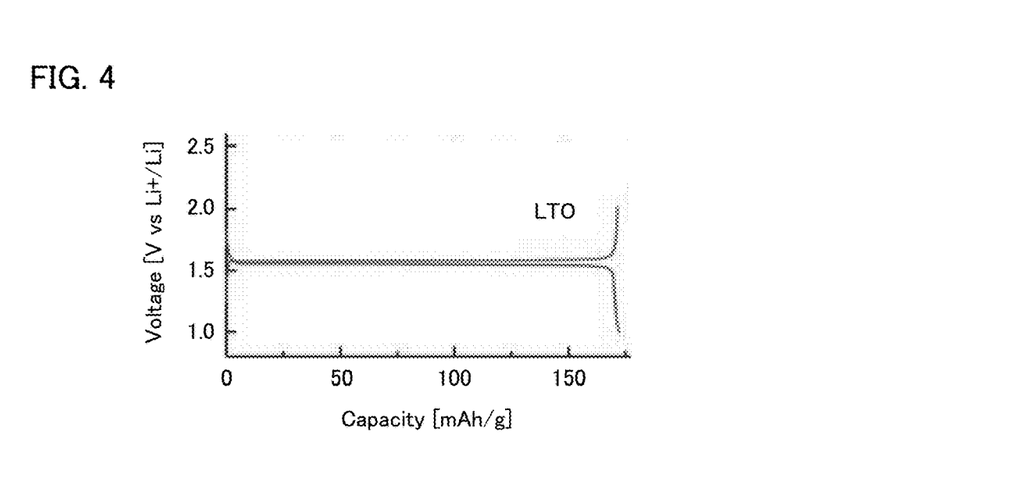
FIG. 4 is charge and discharge curves of a half cell using a LTO as a working electrode, and a Li foil as a counter electrode.

The lithium titanate has advantages such that the expansion and contraction due to charge and discharge do not occur, the chemical stability is high since it is an oxide, and excellent electron conductivity is exhibited in the charged state. Meanwhile, in the lithium titanate, the ratio of the plateau region occupied in the charge and discharge curve is large. FIG. 4 is charge and discharge curves of a half cell using $Li_4Ti_5O_{12}$ (LTO) as a working electrode, and a Li foil as a counter electrode. As shown in FIG. 4, in the LTO, the ratio of the plateau region occupancy is large at the time of both Li intercalation (when the all solid state battery is charged) and Li desorption (when the all solid state battery is discharged). Incidentally, the potential of the LTO decreases at the time of Li intercalation (when the all solid state battery is charged), and the potential of the LTO increases at the time of Li desorption (when the all solid state battery is discharged).

Figure 5A:
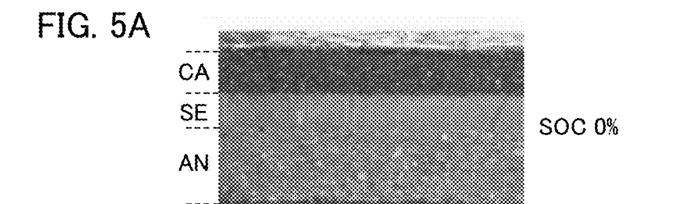
FIGS. 5A to 5D are schematic cross-sectional views illustrating the state change of the anode active material layer containing the LTO in a charged state.

When the ratio of the plateau region occupied in the charge and discharge curves is large, the electrode reactions tend to deviate in the thickness direction of the anode active material layer. FIGS. 5A to 5D are the schematic cross-sectional views illustrating the state changes of the anode active material layer containing $Li_4Ti_5O_{12}$ (LTO) in the charged state. First, the all solid state battery shown in FIG. 5A includes layers in the order of an anode active material layer (AN), a solid electrolyte layer (SE), and a cathode active material layer (CA) along with the thickness direction. As shown in FIG. 5A, when SOC (State of Charge) is 0%, the color of the anode active material layer (AN) is uniform in the thickness direction.

Figure 5B:
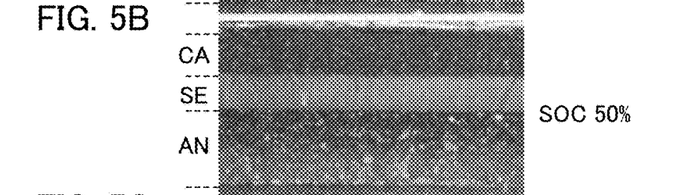
Figure 5C:
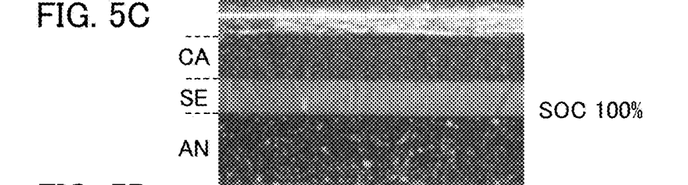

Next, as shown in FIG. 5B, when SOC is 50%, the color of the anode active material layer (AN) in the solid electrolyte layer (SE) side region is dark. This shows that Li is intercalated to LTO that is positioned in the SE side. Meanwhile, when SOC is 50%, the color of the anode active material layer (AN) in the opposite side of the solid electrolyte layer (SE) region is equivalent color to that of FIG. 5A. Next, as shown in FIG. 5C, when SOC is 100%, the color of the anode active material layer (AN) is uniformly dark in the thickness direction. This shows that Li is intercalated to whole LTO included in the anode active material layer (AN).

Figure 5D:
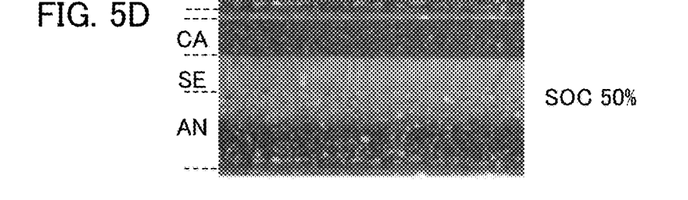

Next, when the battery is discharged from SOC 100% to SOC 50%, as shown in FIG. 5D, the color of the anode active material layer (AN) in the solid electrolyte layer (SE) side region is light. This shows that Li is desorbed from LTO that is positioned in SE side. Meanwhile, when SOC is 50%, the color of the anode active material layer (AN) in the opposite side of the solid electrolyte layer (SE) side region is equivalent color to that of FIG. 5C. This shows that Li is not desorbed from LTO that is positioned in the opposite side of SE.

As shown in FIGS. 5A to 5D, the reaction of the anode active material (LTO) and Li easily occurs in the region of the anode active material layer (AN) close to the solid electrolyte layer (SE), and does not easily occur in the region of the anode active material layer (AN) far from the solid electrolyte layer (SE). For this reason, when SOC is low, influence of the ion conduction resistance in the thickness direction is little, but when SOC is high, influence of the ion conduction resistance in the thickness direction is large. As a result, electrode reactions tend to deviate in the thickness direction of the anode active material layer.

Figure 6:
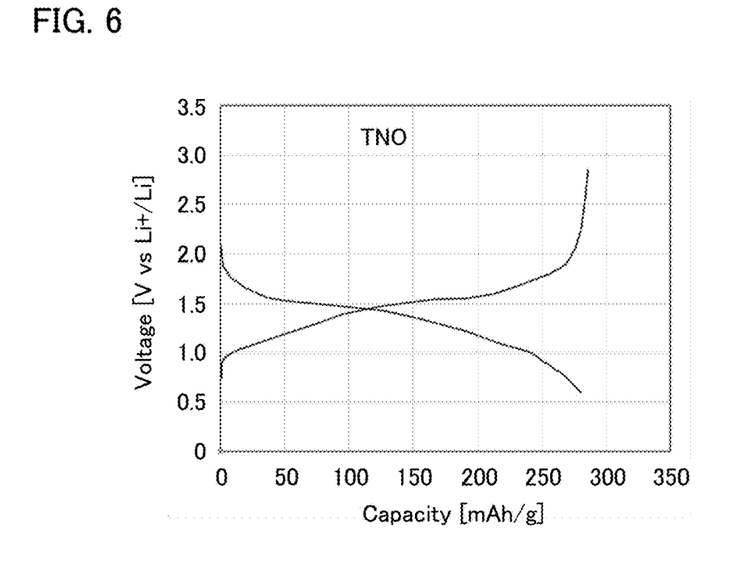
FIG. 6 is charge and discharge curves of a half cell using a TNO as a working electrode, and a Li foil as a counter electrode.

In contrast, in the present disclosure, the first anode active material (lithium titanate) is used together with the second anode active material (such as niobium-titanium oxide) of which ratio of the plateau region occupancy is smaller than that of the first anode active material. FIG. 6 is charge and discharge curves of a half cell using $TiNb_2O_7$ (TNO) as a working electrode, and a Li foil as a counter electrode.

As shown in FIG. 6, the plateau region occupied in TNO is smaller than that of LTO. For this reason, in the initial stage of Li intercalation (when the all solid state battery is charged), Li is intercalated to TNO at higher potential than that of LTO. As a result, in the region of the anode active material layer (AN) far from the solid electrolyte layer (SE), TNO reacts more rapidly than LTO, and thereby the deviation of electrode reactions in the thickness direction may be mitigated. As a result, the resistance at the time of charging may be reduced. Also, in the initial stage of Li desorption (when the all solid state battery is discharged), Li is desorbed from TNO at lower potential than that of LTO. As a result, in the region of the anode active material layer (AN) far from the solid electrolyte layer (SE), TNO reacts more rapidly than LTO, and thereby the deviation of electrode reactions in the thickness direction may be mitigated. As a result, the resistance at the time of discharging may be reduced. In this manner, in the present disclosure, the first anode active material that is the lithium titanate is used together with the specified second anode active material, and thus the anode active material layer with low resistance may be obtained.

Further, in the present disclosure, the proportion of the first anode active material in the solid electrolyte layer side is relatively less and the proportion of the first anode active material in the opposite side of the solid electrolyte layer is relatively more. By arranging such an inclination, deviation of electrode reactions in the thickness direction may be further mitigated, and the resistance may be effectively reduced. Also, as described in Examples later, by setting the proportion of the first anode active material in the solid electrolyte layer side being less and the proportion of the first anode active material in the opposite side of the solid electrolyte layer being more, an all solid state battery may have excellent rate properties.

1. Anode Active Material Layer

The anode active material layer in the present disclosure comprises at least a first anode active material and a second anode active material as the anode active material. The anode active material layer may further contain at least one of a solid electrolyte, a conductive material, and a binder.

(1) Second Anode Active Material

First, a second anode active material will be explained. In the second anode active material, when a discharge capacity at a potential of 1.0 V vs $Li^+/Li$ or more and 2.0 V vs $Li^+/Li$ or less signifies 100% discharge capacity, and when $P_1$ designates an average potential in a capacity of 0% or more and 50% or less of the 100% discharge capacity, and $P_2$ designates an average potential in a capacity of 50% or more and 100% or less of the 100% discharge capacity, a difference between the $P_2$ and the $P_1$ is usually 0.1 V or more. Incidentally, since the potential of the second anode active material in the all solid state battery increases due to discharging, $P_2$ is usually larger than $P_1$.

$P_1$ and $P_2$ can be obtained from the following method. First, a half cell including a working electrode containing the second anode active material, a solid electrolyte layer, and a counter electrode that is a Li foil, is prepared. Incidentally, the working electrode may contain at least one of a solid electrolyte and a conductive material as required. Next, constant current (CC) discharge at 1/10 C is conducted to the half cell to intercalate Li in the amount equivalent to SOC 100%, to the second anode active material. After that, CC charge at 1/10 C is conducted to the half cell to desorb Li from the second anode active material. On this occasion, capacity at the potential of 1.0 V vs $Li^+/Li$ or more and 2.0 V vs $Li^+/Li$ or less is measured so as to obtain 100% discharge capacity. Next, an average potential $P_1$ in the capacity of 0% or more and 50% or less of the 100% discharge capacity, and an average potential $P_2$ in the capacity of 50% or more and 100% or less of the 100% discharge capacity are obtained from Li desorption curve.

The difference between $P_2$ and $P_1$ may be 0.2 V or more, may be 0.3 V or more, and may be 0.4 V or more. Incidentally, the difference between $P_2$ and $P_1$ in the TNO shown in FIG. 6 is 0.3 V. Also, $P_1$ is preferably lower than the discharge reaction potential (plateau potential) of the first anode active material. $P_1$ is, for example, smaller than 1.5 V vs $Li^+/Li$, and may be 1.45 V vs $Li^+/Li$ or less. Also, $P_2$ may be higher than the discharge reaction potential (plateau potential) of the first anode active material. $P_2$ is, for example, larger than 1.5 V vs $Li^+/Li$, and may be 1.55 V vs $Li^+/Li$ or more.

Also, in the second anode active material, when a charge capacity at a potential of 2.0 V vs $Li^+/Li$ or less and 1.0 V vs $Li^+/Li$ or more signifies 100% charge capacity, and when $P_3$ designates an average potential in a capacity of 0% or more and 50% or less of the 100% charge capacity, and $P_4$ designates an average potential in a capacity of 50% or more and 100% or less of the 100% charge capacity, a difference between the $P_3$ and the $P_4$ may be 0.1 V or more. Incidentally, since the potential of the second anode active material in the all solid state battery decreases due to charging, $P_3$ is usually larger than $P_4$.

$P_3$ and $P_4$ can be obtained from the following method. That is, a half cell is prepared in the same manner as above, and the cell is CC discharged at 1/10 C to intercalate Li to the second anode active material. On this occasion, capacity at the potential of 2.0 V vs Li$^+$/Li or less and 1.0 V vs Li$^+$/Li or more is measured so as to obtain 100% charge capacity. Next, an average potential $P_3$ in the capacity of 0% or more and 50% or less of the 100% charge capacity, and an average potential $P_4$ in the capacity of 50% or more and 100% or less of the 100% charge capacity are obtained from Li intercalation curve.

The difference between $P_3$ and $P_4$ may be 0.2 V or more, may be 0.3 V or more, and may be 0.4 V or more. Also, $P_3$ is preferably higher than the charge reaction potential (plateau potential) of the first anode active material. $P_3$ is, for example, larger than 1.5 V vs Li$^+$/Li, and may be 1.55 V vs Li$^+$/Li or more. $P_4$ may be lower than the charge reaction potential (plateau potential) of the first anode active material. $P_4$ is, for example, smaller than 1.5 V vs Li$^+$/Li, and may be 1.45 V vs Li$^+$/Li or less.

The discharge capacity of the second anode active material at a potential of 1.4 V vs Li$^+$/Li or more and 2.0 V vs Li$^+$/Li or less is, for example, 100 mAh/g or more. This discharge capacity can be obtained from the following method. That is, a half cell is prepared in the same manner as above, and Li in the equivalent amount of SOC 100% is intercalated to the second anode active material at 1/10 C. After that, CC charge at 1/10 C is conducted to the half cell to desorb Li from the second anode active material. On this occasion, the capacity at the potential of 1.4 V vs Li$^+$/Li or more and 2.0 V vs Li$^+$/Li or less is measured so as to obtain the discharge capacity. The discharge capacity of the second anode active material at a potential of 1.4 V vs Li$^+$/Li or more and 2.0 V vs Li$^+$/Li or less may be 120 mAh/g or more, and may be 140 mAh/g or more.

The charge capacity of the second anode active material at a potential of 2.0 V vs Li$^+$/Li or less and 1.4 V vs Li$^+$/Li or more may be 100 mAh/g or more. This charge capacity can be obtained from the following method. That is, a half cell is prepared in the same manner as above, and the cell is CC discharged at 1/10 C to intercalate Li to the second anode active material. On this occasion, the capacity at the potential of 2.0 V vs Li$^+$/Li or less and 1.4 V vs Li$^+$/Li or more is measured so as to obtain the charge capacity. The charge capacity of the second anode active material at a potential of 2.0 V vs Li$^+$/Li or less and 1.4 V vs Li$^+$/Li or more may be 120 mAh/g or more and may be 140 mAh/g or more.

The discharge reaction potential and the charge reaction potential of the second anode active material are not particularly limited, and examples thereof are respectively 1.0 V vs Li$^+$/Li or more and 2.0 V vs Li$^+$/Li or less.

The second anode active material preferably contains a metal element and an oxygen element; in other words, it is preferably a metal oxide. The reason therefor is that the metal oxide has high chemical stability. Examples of the metal element included in the metal oxide may include Nb, Ti and W. The metal oxide may contain just one kind of the above metal element, and may contain two kinds or more thereof.

Examples of the second anode active material may include a niobium-titanium oxide. The niobium-titanium oxide is a compound containing Nb, Ti and O. Examples of the niobium-titanium oxide may include $TiNb_2O_7$ and $Ti_2Nb_{10}O_{29}$. Also, examples of the second anode active material may include a niobium-tungsten oxide. The niobium-tungsten oxide is a compound containing Nb, W and O. Examples of the niobium-tungsten oxide may include $Nb_2WO_8$, $Nb_2W_{15}O_{50}$, $Nb_4W_7O_{31}$, $Nb_8W_9O_{47}$, $Nb_{14}W_3O_{44}$, $Nb_{16}W_5O_{55}$ and $Nb_{18}W_{16}O_{93}$.

The average particle size ($D_{50}$) of the second anode active material is, for example, 10 nm or more, and may be 100 nm or more. Meanwhile, the average particle size ($D_{50}$) of the second anode active material is, for example, 50 μm or less, and may be 20 μm or less. The average particle size ($D_{50}$) may be calculated from, for example, a measurement with a laser diffraction particle distribution meter or a scanning electron microscope (SEM).

(2) First Anode Active Material

Next, the first anode active material will be explained. The first anode active material is a lithium titanate. The lithium titanate is a compound containing Li, Ti and O.

In the first anode active material, when a discharge capacity at a potential of 1.0 V vs Li$^+$/Li or more and 2.0 V vs Li$^+$/Li or less signifies 100% discharge capacity, and when $P'_1$ designates an average potential in a capacity of 0% or more and 50% or less of the 100% discharge capacity, and $P'_2$ designates an average potential in a capacity of 50% or more and 100% or less of the 100% discharge capacity, a difference between the $P'_2$ and the $P'_1$ may be less than 0.1 V. $P'_1$ and $P'_2$ can be obtained in the same manner as for the above described $P_1$ and $P_2$ in the second anode active material.

In the first anode active material, when a charge capacity at a potential of 2.0 V vs Li$^+$/Li or less and 1.0 V vs Li$^+$/Li or more signifies 100% charge capacity, and when $P'_3$ designates an average potential in a capacity of 0% or more and 50% or less of the 100% charge capacity, and $P'_4$ designates an average potential in a capacity of 50% or more and 100% or less of the 100% charge capacity, a difference between the $P'_3$ and the $P'_4$ may be less than 0.1 V. $P'_3$ and $P'_4$ can be obtained in the same manner as for the above described $P_3$ and $P_4$ in the second anode active material.

The discharge capacity of the first anode active material at a potential of 1.4 V vs Li$^+$/Li or more and 2.0 V vs Li$^+$/Li or less is preferably 100 mAh/g or more. Likewise, the charge capacity of the first anode active material at a potential of 2.0 V vs Li$^+$/Li or less and 1.4 V vs Li$^+$/Li or more is preferably 100 mAh/g or more. The measurement methods for the discharge capacity and the charge capacity are the same as the measurement methods for the discharge capacity and the charge capacity in the second anode active material described above.

The discharge reaction potential and the charge reaction potential of the first anode active material are not particularly limited, and examples thereof are respectively 1.0 V vs Li$^+$/Li or more and 2.0 V vs Li$^+$/Li or less.

Specific examples of the first anode active material may include $Li_4Ti_5O_{12}$, $Li_4TiO_4$, $Li_2TiO_3$ and $Li_2Ti_3O_7$. Examples of the shape of the first anode active material may include a granular shape. The average particle size ($D_{50}$) of the first anode active material is, for example, 10 nm or more, and may be 100 nm or more. Meanwhile, the average particle size ($D_{50}$) of the first anode active material is, for example, 50 μm or less, and may be 20 μm or less. The average particle size ($D_{50}$) may be calculated from, for example, a measurement with a laser diffraction particle distribution meter or a scanning electron microscope (SEM).

(3) Anode Active Material Layer

The anode active material layer in the present disclosure contains the first anode active material and the second anode active material. The anode active material layer may contain just the first anode active material and the second anode active material as the anode active material, and may contain an additional anode active material. The proportion of the total of the first anode active material and the second anode active material with respect to all the anode active materials included in the anode active material layer is, for example, 50 volume % or more, may be 70 volume % or more, and may be 90 volume % or more.

Also, as shown in FIG. 2 described above, T designates a thickness of the anode active material layer 2, X designates a region of the anode active material layer 2 that is from an edge of the solid electrolyte layer 3 side to T/2 in a thickness direction $D_T$, Y designates a region of the anode active material layer 2 that is from the T/2 to an opposite edge from the solid electrolyte layer 3 side (edge that is the anode current collector 5 side) in the thickness direction $D_T$. Further, $X_1$ designates a volume ratio of the first anode active material with respect to a total of the first anode active material and the second anode active material in the X region, and $Y_1$ designates a volume ratio of the first anode active material with respect to a total of the first anode active material and the second anode active material in the Y region.

In the present disclosure, usually, $X_1$ is smaller than $Y_1$. The proportion of $Y_1$ with respect to $X_1$ ($Y_1/X_1$) is not particularly limited, but is usually more than 1, may be 1.1 or more, may be 1.5 or more, and may be 2.0 or more. Meanwhile, the proportion of $Y_1$ with respect to $X_1$ ($Y_1/X_1$) is, for example, 10 or less. Incidentally, as in later described Example 2, when $X_1$ is 30 volume % and $Y_1$ is 70 volume %, $Y_1/X_1$ is 2.3.

Also, $X_1$ may be 0 volume %, and may be more than 0 volume %. Meanwhile, $X_1$ is, for example, 50 volume % or less, may be 40 volume % or less, and may be 30 volume % or less. Also, $Y_1$ may be 100 volume %, and may be less than 100 volume %. Meanwhile, $Y_1$ is, for example, 50 volume % or more, may be 60 volume % or more, and may be 70 volume % or more.

The anode active material layer in the present disclosure may have a single layer structure, and may have a multi-layer structure. In the former case, the proportion of the first anode active material in the solid electrolyte layer side is relatively less and the proportion of the first anode active material in the opposite side of the solid electrolyte layer is relatively more in the single layer structure. In the latter case, the number of structure layer configuring the anode active material layer may be 2, and may be 3 or more.

Also, as shown in FIG. 3 described above, the anode active material layer 2 includes a plurality of structure layer (structure layer 21 and structure layer 22), and in the plurality of structure layer, a structure layer A designates a layer closest (structure layer 21) to the solid electrolyte layer 3, and a structure layer B designates a layer farthest (structure layer 22) from the solid electrolyte layer 3. Further, $A_1$ designates a volume ratio of the first anode active material with respect to a total of the first anode active material and the second anode active material in the structure layer A, and $B_1$ designates a volume ratio of the first anode active material with respect to a total of the first anode active material and the second anode active material in the structure layer B.

In the present disclosure, usually, $A_1$ is smaller than $B_1$. The proportion of $B_1$ with respect to $A_1$ ($B_1/A_1$) is not particularly limited, but is usually larger than 1, may be 1.1 or more, may be 1.5 or more, and may be 2.0 or more. Meanwhile, the proportion of $B_1$ with respect to $A_1$ ($B_1/A_1$) is, for example, 10 or less.

Also, $A_1$ may be 0 volume %, and may be larger than 0 volume %. Meanwhile, $A_1$ is, for example, 50 volume % or less, may be 40 volume % or less, and may be 30 volume % or less. Also, $B_1$ may be 100 volume %, and may be smaller than 100 volume %. Meanwhile, $B_1$ is, for example, 50 volume % or more, may be 60 volume % or more, and may be 70 volume % or more. Incidentally, it is preferable that the first anode active material and the second anode active material are respectively dispersed in the anode structure layer uniformly.

The proportion of the anode active material in the anode active material layer is, for example, 30 volume % or more, and may be 50 volume % or more. If the proportion of the anode active material is too little, there is a possibility that volume energy density may not be improved. Meanwhile, the proportion of the anode active material in the anode active material layer is, for example, 80 volume % or less. If the proportion of the anode active material is too much, there is a possibility that excellent electron conducting path and ion conducting path may not be formed.

It is preferable that the anode active material layer contains a solid electrolyte. The reason therefor is to form excellent ion conducting path. Examples of the solid electrolyte may include an inorganic solid electrolyte such as a sulfide solid electrolyte, an oxide solid electrolyte, a nitride solid electrolyte, and a halide solid electrolyte.

Examples of the sulfide solid electrolyte may include a solid electrolyte containing a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the halogen element may include a F element, a Cl element, a Br element, and an I element. The sulfide solid electrolyte may be glass (amorphous), and may be a glass ceramic. Examples of the sulfide solid electrolyte may include $Li_2S$—$P_2S_5$, $LiI$—$Li_2S$—$P_2S_5$, $LiI$—$LiBr$—$Li_2S$—$P_2S_5$, $Li_2S$—$SiS_2$, $Li_2S$—$GeS_2$, and $Li_2S$—$P_2S_5$—$GeS_2$.

The anode active material layer may contain just the inorganic solid electrolyte as the solid electrolyte. Also, the anode active material layer may or may not contain a liquid electrolyte (electrolyte solution). Also, the anode active material layer may or may not contain a gel electrolyte. Also, the anode active material layer may or may not contain a polymer electrolyte.

It is preferable that the anode active material layer contains a conductive material. Examples of the conductive material may include a carbon material, a metal particle, and a conductive polymer. Examples of the carbon material may include a particulate carbon material such as acetylene black (AB) and Ketjen black (KB), and a fiber carbon material such as carbon fiber, carbon nanotube (CNT), and carbon nanofiber (CNF).

The anode active material layer may contain a binder. Examples of the binder may include a fluoride-based binder, a polyimide-based binder and a rubber-based binder. Also, the thickness of the anode active material layer is, for example, 0.1 μm or more and 1000 μm or less. The anode active material layer is used in an all solid state battery. Details of the all solid state battery will be described later.

2. Cathode Active Material Layer

The cathode active material layer in the present disclosure is a layer containing at least a cathode active material. Also, the cathode active material layer may contain at least one of a conductive material, a solid electrolyte, and a binder, as required.

Examples of the cathode active material may include an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li_4Ti_5O_{12}$ and $Li(Ni_{0.5}Mn_{1.5})O_4$; and an olivine type active material such as $LiFePO_4$, $LiMnPO_4$, $LiNiPO_4$, and $LiCoPO_4$.

A protective layer containing Li-ion conductive oxide may be formed on the surface of the oxide active material. The reason therefor is to inhibit the reaction of the oxide active material and the solid electrolyte. Examples of the Li-ion conductive oxide may include $LiNbO_3$. The thickness of the protective layer is, for example, 1 nm or more and 30 nm or less. Also, as the cathode active material, for example, $Li_2S$ can be used.

Examples of the shape of the cathode active material may include a granular shape. The average particle size ($D_{50}$) of the cathode active material is not particularly limited, and for example, it is 10 nm or more, and may be 100 nm or more. Meanwhile, the average particle size ($D_{50}$) of the cathode active material is, for example, 50 μm or less, and may be 20 μm or less.

Examples of the conductive material may include a carbon material, a metal particle, and a conductive polymer. Examples of the carbon material may include a particulate carbon material such as acetylene black (AB) and Ketjen black (KB), and a fiber carbon material such as carbon fiber, carbon nanotube (CNT), and carbon nanofiber (CNF).

The solid electrolyte and the binder to be used in the cathode active material layer are in the same contents as those described in "1. Anode active material layer" above; thus, the descriptions herein are omitted. The thickness of the cathode active material layer is, for example, 0.1 μm or more and 1000 μm or less.

3. Solid Electrolyte Layer

The solid electrolyte layer in the present disclosure is a layer arranged between the cathode active material layer and the anode active material layer, and contains at least a solid electrolyte. The solid electrolyte layer preferably contains a sulfide solid electrolyte as the solid electrolyte. Also, the solid electrolyte layer may contain a binder. The solid electrolyte and the binder to be used in the solid electrolyte layer are in the same contents as those described in "1. Anode active material layer" above; thus, the descriptions herein are omitted. The thickness of the solid electrolyte layer is, for example, 0.1 μm or more and 1000 μm or less.

4. All Solid State Battery

The all solid state battery in the present disclosure usually comprises a cathode current collector for collecting currents of the cathode active material layer and an anode current collector for collecting currents of the anode active material layer. Examples of the shape of the cathode current collector and the anode current collector may include a foil shape. Examples of the material for the cathode current collector may include SUS, aluminum, nickel, and carbon. Also, examples of the material for the anode current collector may include SUS, copper, nickel, and carbon.

The all solid state battery in the present disclosure comprises at least one of a power generating unit including a cathode active material layer, a solid electrolyte layer and an anode active material layer, and may comprise two or more of the unit. When the all solid state battery comprises a plurality of the power generating unit, they may be connected in parallel and may be connected in series. The all solid state battery in the present disclosure includes an outer package for storing the cathode current collector, the cathode active material layer, the solid electrolyte layer, the anode active material layer and the anode current collector. There are no particular limitations on the kind of the outer package, and examples thereof may include a laminate outer package.

The all solid state battery in the present disclosure may include a restraining jig that applies a restraining pressure along with the thickness direction of the cathode active material layer, the solid electrolyte layer and the anode active material layer. Excellent ion conducting path and electron conducting path may be formed by applying the restraining pressure. The restraining pressure is, for example, 0.1 MPa or more, may be 1 MPa or more, and may be 5 MPa or more. Meanwhile, the restraining pressure is, for example, 100 MPa or less, may be 50 MPa or less, and may be 20 MPa or less.

The all solid state battery in the present disclosure is typically an all solid lithium ion secondary battery. The application of the all solid state battery is not particularly limited, and examples thereof may include a power source for vehicles such as hybrid electric vehicles, battery electric vehicles, fuel cell electric vehicles and diesel powered automobiles. In particular, it is preferably used as a power source for driving hybrid electric vehicles and battery electric vehicles. Also, the all solid state battery in the present disclosure may be used as a power source for moving bodies other than vehicles (such as rail road transportation, vessel and airplane), and may be used as a power source for electronic products such as information processing equipment.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Production of Anode>

As raw materials, $Li_4Ti_5O_{12}$ (LTO) particles, $TiNb_2O_7$ (TNO) particles, a sulfide solid electrolyte, a vapor grown carbon fiber, a PVdF-based binder and butyl butyrate were prepared and agitated by an ultrasonic dispersion device to obtain anode slurry α and anode slurry β. The volume ratio of each raw material in the anode slurry α was LTO particles:TNO particles:sulfide solid electrolyte:vapor grown carbon fiber:PVdF-based binder=0:59.7:32.2:2.5:5.6. In other words, TNO particles were used in the anode slurry α, but LTO particles were not used. Meanwhile, the volume ratio of each raw material in the anode slurry β was LTO particles:TNO particles:sulfide solid electrolyte:vapor grown carbon fiber:PVdF-based binder=59.7:0:32.2: 2.5: 5.6. In other words, LTO particles were used in the anode slurry R, but TNO particles were not used.

The anode slurry β was pasted on an Al foil in 205 μm gap by a blade method and dried in the conditions of 100° C. on a hot plate for 30 minutes. The dried layer and a roughen Ni foil as an anode current collector were faced to each other and pressed with a roll pressing machine in the condition of the pressing pressure of 10 kN/cm. After that, the Al foil was peeled off to obtain an intermediate body including an anode current collector and an anode active material layer β.

Next, the anode slurry α was pasted on an Al foil in 205 μm gap by a blade method and dried in the conditions of 100° C. on a hot plate for 30 minutes. The dried layer and the anode active material layer β in the intermediate body were faced to each other and pressed with a roll pressing machine in the condition of the pressing pressure of 10 kN/cm. After that, the Al foil was peeled off to obtain an anode including an anode current collector, an active material layer R, and an active material layer α.

<Production of Cathode>

As raw materials, $LiNi_{1/3}Co_{1/3}Mn_{1/3}O_2$ (cathode active material), a sulfide solid electrolyte, vapor grown carbon fiber, a PVdF-based binder and butyl butyrate were prepared, and agitated by an ultrasonic dispersion device to obtain cathode slurry. The volume ratio of each raw material in the cathode slurry was cathode active material:sulfide solid electrolyte:vapor grown carbon fiber:PVdF-based binder=66.5:28.5:3.7:1.4. The obtained cathode slurry was pasted on an Al foil that was as a cathode current collector by a blade method, and dried in the conditions of 100° C. on a hot plate for 30 minutes. Thereby, a cathode including a cathode current collector and a cathode active material layer was obtained.

<Production of Solid Electrolyte Layer>

As raw materials, a sulfide solid electrolyte, a PVdF-based binder and butyl butyrate were prepared and agitated by an ultrasonic dispersion device to obtain solid electrolyte slurry. The weight ratio of each raw material in the solid electrolyte slurry was sulfide solid electrolyte:PVdF-based binder=99.4:0.4. The obtained solid electrolyte slurry was pasted on an Al foil by a blade method and dried in the conditions of 100° C. on a hot plate for 30 minutes. Thereby, a solid electrolyte layer on the Al foil (a solid electrolyte layer peelable from the Al foil) was obtained.

<Production of all Solid State Battery>

The cathode active material layer in the cathode and the solid electrolyte layer were faced to each other and pressed with a roll pressing machine in the conditions of the pressing pressure of 50 kN/cm and the temperature of 160° C. After that, the Al foil was peeled off from the solid electrolyte layer and punched out into the size of 1 cm² to obtain a cathode layered body.

Next, the anode active material layer in the anode and the solid electrolyte layer were faced to each other and pressed with a roll pressing machine in the conditions of the pressing pressure of 50 kN/cm and the temperature of 160° C. After that, the Al foil was peeled off from the solid electrolyte layer to obtain an anode layered body. In addition, the solid electrolyte layer in the anode layered body and the other solid electrolyte layer were faced to each other and temporary pressed with a plane uniaxial pressing machine in the conditions of the pressing pressure of 100 MPa and the temperature of 25° C. After that, the Al foil was peeled off from the solid electrolyte layer and punched out into the size of 1.08 cm² to obtain an anode structure body including a solid electrolyte layer and an anode layered body.

The solid electrolyte layer in the cathode layered body and the solid electrolyte layer in the anode structure body were faced to each other and pressed with a plane uniaxial pressing machine in the conditions of the pressing pressure of 200 MPa and the temperature of 120° C. Thereby, an all solid state battery was obtained.

Example 2

An all solid state battery was obtained in the same manner as in Example 1, except that the volume ratio of each raw material in the anode slurry α was changed to LTO particles:TNO particles:sulfide solid electrolyte:vapor grown carbon fiber:PVdF-based binder=17.9:41.8:32.2:2.5:5.6, and the volume ratio of each raw material in the anode slurry β was changed to LTO particles:TNO particles:sulfide solid electrolyte:vapor grown carbon fiber:PVdF-based binder=41.8: 17.9:32.2:2.5:5.6. Incidentally, the volume ratio of the LTO particles and the TNO particles in the anode slurry α was LTO particles:TNO particles=30:70, and the volume ratio of the LTO particles and the TNO particles in the anode slurry β was LTO particles:TNO particles=70:30.

Comparative Example 1

As raw materials, $Li_4Ti_5O_{12}$ (LTO) particles, a sulfide solid electrolyte, a vapor grown carbon fiber, a PVdF-based binder and butyl butyrate were prepared and agitated by an ultrasonic dispersion device to obtain anode slurry. The volume ratio of each raw material in the anode slurry was LTO particles:sulfide solid electrolyte:vapor grown carbon fiber:PVdF-based binder=59.7:32.2:2.5:5.6. In this anode slurry, LTO particles were used, but TNO particles were not used.

The anode slurry was pasted on an Al foil in 400 μm gap by a blade method and dried in the conditions of 100° C. on a hot plate for 30 minutes. The dried layer and a roughen Ni foil as an anode current collector were faced to each other and pressed with a roll pressing machine in the condition of the pressing pressure of 10 kN/cm. After that, the Al foil was peeled off to obtain an anode including an anode current collector and an anode active material layer. An all solid state battery was obtained in the same manner as in Example 1 except that the obtained anode was used.

Comparative Example 2

As raw materials, $TiNb_2O_7$ (TNO) particles, a sulfide solid electrolyte, a vapor grown carbon fiber, a PVdF-based binder and butyl butyrate were prepared and agitated by an ultrasonic dispersion device to obtain anode slurry. The volume ratio of each raw material in the anode slurry was TNO particles:sulfide solid electrolyte:vapor grown carbon fiber:PVdF-based binder=59.7:32.2:2.5:5.6. In this anode slurry, TNO particles were used, but LTO particles were not used. An all solid state battery was obtained in the same manner as in Comparative Example 1 except that the obtained anode slurry was used.

Reference Example 1

As raw materials, $Li_4Ti_5O_{12}$ (LTO) particles, $TiNb_2O_7$ (TNO) particles, a sulfide solid electrolyte, a vapor grown carbon fiber, a PVdF-based binder and butyl butyrate were prepared and agitated by an ultrasonic dispersion device to obtain anode slurry. The volume ratio of each raw material in the anode slurry was LTO particles:TNO particles:sulfide solid electrolyte:vapor grown carbon fiber:PVdF-based binder=29.85:29.85:32.2:2.5:5.6. The volume ratio of the LTO particles and the TNO particles in this anode slurry was LTO particles:TNO particles=50:50. An all solid state battery was obtained in the same manner as in Comparative Example 1 except that the obtained anode slurry was used.

[Evaluation]

<Resistance Measurement>

The all solid state batteries obtained in Examples 1, 2, Comparative Examples 1, 2 and Reference Example 1 were respectively sandwiched between two pieces of restraining plate and restrained at the restraining pressure of 5 MPa with a fastener. After that, the batteries were respectively constant-current (CC) charged at 1/10 C until 2.95 V, and then constant-voltage (CV) charged at 2.95 V until the termination current of 1/100 C. Further, the batteries were respectively CC-discharged at 1/10 C until 1.5 V, and then CV-discharged at 1.5 V until the termination current of 1/100 C. The CC-discharge capacity and the CV-discharge capacity until 1.5 V were added up to obtain the discharge capacity.

Also, to the restrained all solid state batteries, an initial charge (CC-charge) was respectively conducted at 1/10 C so that the discharge capacity became 50%, and thereby the SOC was adjusted. Using the all solid state batteries after the adjustment, current of 8 mA/cm² was flowed for 10 seconds, and the voltage changes before and after that were divided by the current value to obtain the resistance. The results are shown in Table 1 and FIG. 7.

TABLE 1

| | Anode active material layer | | |
|---|---|---|---|
| | Solid electrolyte layer side | Anode current collector side | Resistance [Ω/cm²] |
| Example 1 | TNO 100 vol % | LTO 100 vol % | 19.2 |
| Example 2 | LTO 30 vol % TNO 70 vol % | LTO 70 vol % TNO 30 vol % | 21.1 |
| Comparative Example 1 | LTO 100 vol % | | 25.2 |
| Comparative Example 2 | TNO 100 vol % | | 31.3 |
| Reference Example 1 | LTO 50 vol %, TNO 50 vol % | | 22.1 |

Figure 7:
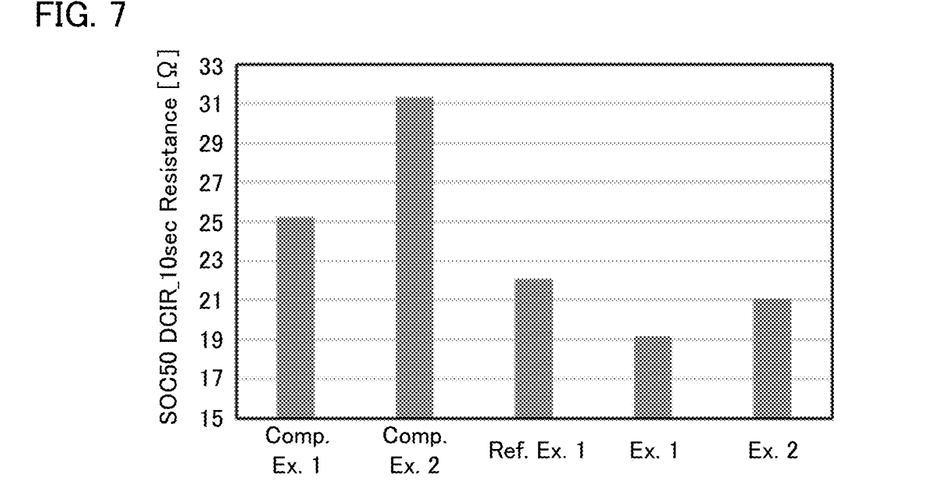
FIG. 7 is the result of resistance measurements for all solid state batteries obtained in Examples 1, 2, Comparative Examples 1, 2 and Reference Example 1.

As shown in Table 1 and FIG. 7, it was confirmed that the resistance of Examples 1 to 2 was respectively lower than that of Comparative Examples 1, 2, and Reference Example 1. Here, the resistance of Comparative Example 2 (only with TNO particles) was higher than that of Comparative Example 1 (only with LTO particles). For this reason, it was predicted that the resistance of Reference Example 1 (with LTO particles and TNO particles) would be higher than that of Comparative Example 1 (only with LTO particles); however, surprisingly, it was confirmed that the resistance of Reference Example 1 was lower than that of Comparative Example 1. Compared to that Reference Example 1, remarkable effect was obtained in Examples 1 and 2, such that the resistance thereof was further lower. In this manner, the resistance was significantly reduced when the LTO particles were used together with the TNO particles, and when the proportion of the LTO particles in the solid electrolyte layer side was relatively less and the proportion of the LTO in the anode current collector side was relatively more.

<Rapid Charge and Discharge Test>

The all solid state batteries obtained in Example 1 and Comparative Examples 1 to 2 were respectively sandwiched between two pieces of restraining plate and restrained at the restraining pressure of 5 MPa with a fastener. After that, the batteries were respectively constant-current (CC) charged at 1/10 C until 2.95 V, and then constant-voltage (CV) charged at 2.95 V until the termination current of 1/100 C. Further, the batteries were respectively CC-discharged at 1/10 C until 1.5 V, and then CV-discharged at 1.5 V until the termination current of 1/100 C.

Next, as a rapid charge and discharge test, the batteries were respectively constant-current (CC) charged at 5 C until 2.95 V, and then constant-voltage (CV) charged at 2.95 V until the termination current of 1/100 C. Further, the batteries were respectively CC-discharged at 5 C until 1.5 V, and then CV-discharged at 1.5 V until the termination current of 1/100 C. The CC-charge capacity was obtained as a rapid charge capacity, and the CC-discharge capacity was obtained as a rapid discharge capacity. The results are shown in Table 2 and FIG. 8.

TABLE 2

| | Rapid charge capacity [mAh/g] | Rapid discharge capacity [mAh/g] |
|---|---|---|
| Example 1 | 129 | 122 |
| Comparative Example 1 | 106 | 115 |
| Comparative Example 2 | 94 | 100 |

Figure 8:
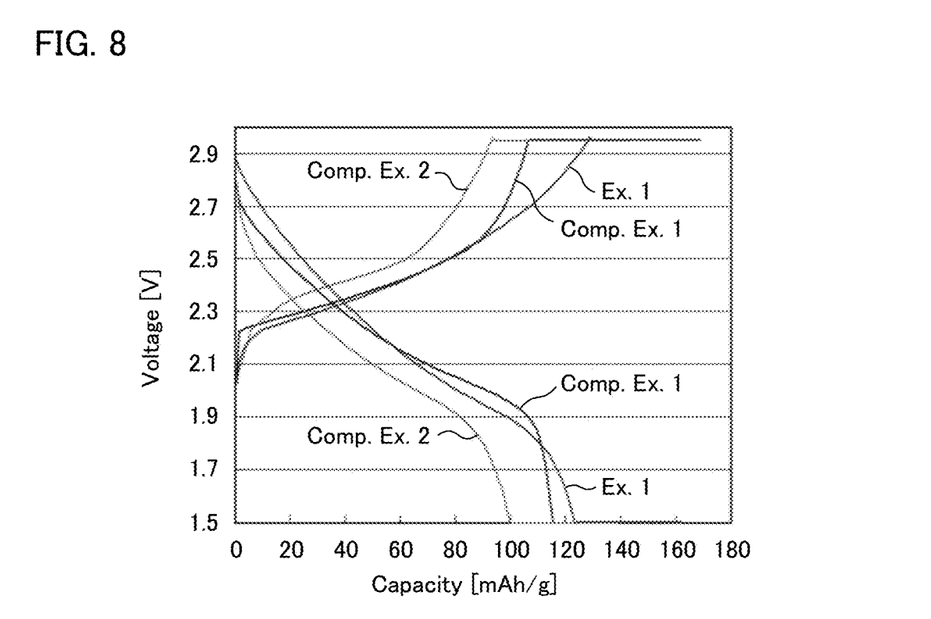
FIG. 8 is the result of rapid charge and discharge tests for all solid state batteries obtained in Example 1 and Comparative Examples 1 to 2.

As shown in Table 2 and FIG. 8, it was confirmed that the rapid charge capacity and the rapid discharge capacity of Example 1 was more than that of Comparative Examples 1 and 2. In this manner, the rate properties improved when the LTO particles were used together with the TNO particles, and when the proportion of the LTO particles in the solid electrolyte layer side was relatively less and the proportion of the LTO particles in the anode current collector side was relatively more.

REFERENCE SIGNS LIST 1 cathode active material layer
2 anode active material layer
3 solid electrolyte layer
4 cathode current collector
5 anode current collector
10 all solid state battery

What is claimed is:

1. An all solid state battery comprising a cathode active material layer, an anode active material layer, and a solid electrolyte layer arranged between the cathode active material layer and the anode active material layer; wherein the anode active material layer includes:
   a first anode active material and a second anode active material;
   the first anode active material is a lithium titanate;
   in the second anode active material, when a discharge capacity at a potential of 1.0 V vs Li⁺/Li or more and 2.0 V vs Li⁺/Li or less signifies 100% discharge capacity, and when $P_1$ designates an average potential in a capacity of 0% or more and 50% or less of the 100% discharge capacity, and $P_2$ designates an average potential in a capacity of 50% or more and 100% or less of the 100% discharge capacity, a difference between the $P_2$ and the $P_1$ is 0.1 V or more; and
   when T designates a thickness of the anode active material layer, X designates a region of the anode active material layer that is from an edge of the solid electrolyte layer side to T/2 in a thickness direction, Y designates a region of the anode active material layer that is from the T/2 to an opposite edge from the solid electrolyte layer side in the thickness direction, $X_1$ designates a volume ratio of the first anode active material with respect to a total of the first anode active material and the second anode active material in the X, and $Y_1$ designates a volume ratio of the first anode active material with respect to a total of the first anode active material and the second anode active material in the Y, the $X_1$ is smaller than the $Y_1$, and the $X_1$ is more than 0 volume % and 30 volume % or less, the $Y_1$ is 70 volume % or more and less than 100 volume %, and the proportion of $Y_1$ with respect to $X_1$ ($Y_1/X_1$) is 2.0 or more.

2. The all solid state battery according to claim 1, wherein a discharge capacity of the second anode active material at a potential of 1.4 V vs Li⁺/Li or more and 2.0 V vs Li⁺/Li or less is 100 mAh/g or more.

3. The all solid state battery according to claim 1, wherein the second anode active material is at least one of a niobium-titanium oxide and a niobium-tungsten oxide.

\* \* \* \* \*